July 31, 1951   A. I. CAQUOT ET AL   2,562,601
TANKS ADAPTED TO CONTAIN LIQUIDS OR GASES
Filed Jan. 6, 1945   5 Sheets-Sheet 1

INVENTOR.
Albert Irenée Caquot
Leon Joseph Dubois
BY
Bailey, Stephens & Huettig
ATTORNEYS INVENTOR.
Albert Irénée Caquot
Leon Joseph DuBois

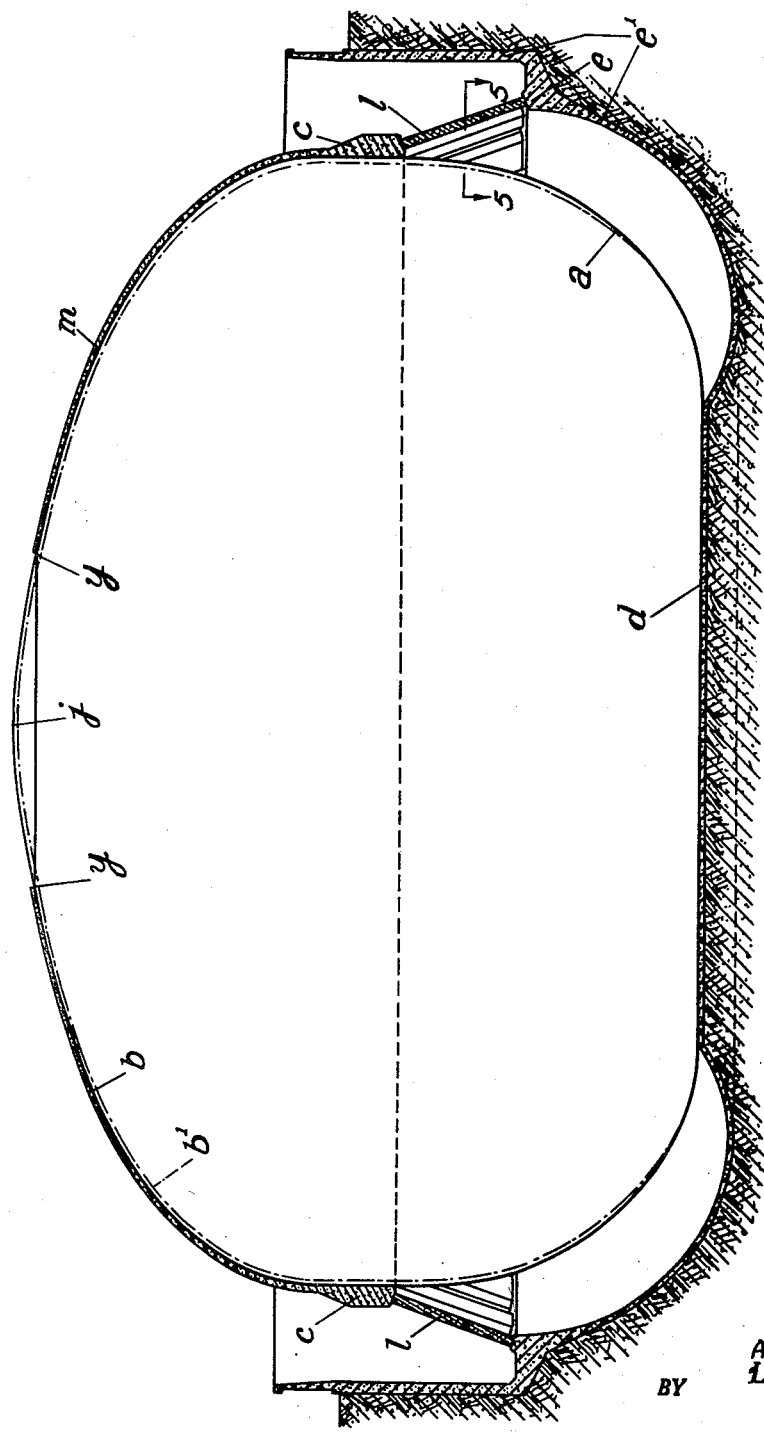

July 31, 1951   A. I. CAQUOT ET AL   2,562,601
TANKS ADAPTED TO CONTAIN LIQUIDS OR GASES
Filed Jan. 6, 1945   5 Sheets-Sheet 4
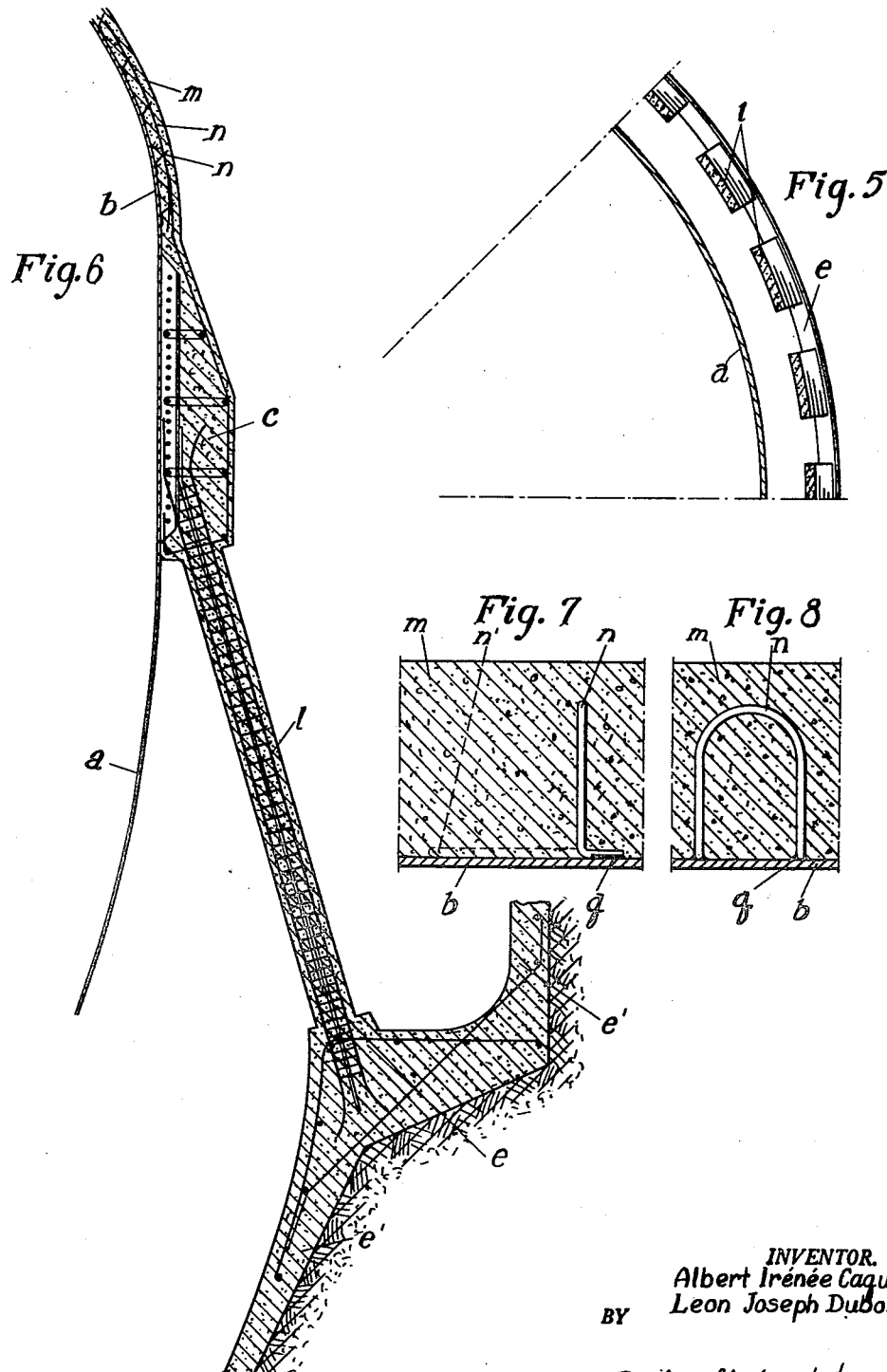
INVENTOR.
Albert Irénée Caquot
Leon Joseph DuBois
BY
Bailey, Stephens & Huettig
ATTORNEYS July 31, 1951    A. I. CAQUOT ET AL    2,562,601
TANKS ADAPTED TO CONTAIN LIQUIDS OR GASES
Filed Jan. 6, 1945    5 Sheets-Sheet 5

INVENTOR.
Albert Irenée Caquot
Leon Joseph Dubois
BY
Bailey, Stephens & Huettig
ATTORNEYS Patented July 31, 1951

2,562,601

UNITED STATES PATENT OFFICE 2,562,601

TANKS ADAPTED TO CONTAIN LIQUIDS OR GASES

Albert Irénée Caquot and Léon Joseph Dubois, Paris, France; said Caquot assignor to said Dubois Application January 6, 1945, Serial No. 571,604
In France July 3, 1942

Section 1, Public Law 690, August 8, 1946
Patent expires July 3, 1962

8 Claims. (Cl. 220—1)

Our invention relates to tanks and more particularly to tanks adapted to contain liquids or gases, or liquids, such as liquid fuels, with gases or vapours under pressure or vacuum with respect to atmospheric pressure.

One object of our invention is to avoid losses resulting from climate variations under their three main forms, viz. temperature variations, heat radiations and atmospheric pressure variations.

A further object of our invention is to devise tanks of the kind above referred to in such a manner that their walls are only submitted to tensile stresses in the most favourable direction even when the tank is empty, the said walls thus remaining in a state of stable equilibrium under the action of internal or external pressure variations.

Still a further object of our invention consists in a tank wherein the lower part is hung to a belt connected with a base, means being preferably provided for allowing said belt to follow temperature expansions in the most favourable direction.

Another object of our invention is to provide means adapted to give rise to tensile stresses in the upper part of the tank, or in any other part thereof, the said tensile stresses being approximately equal to or larger than the stresses resulting from the highest working pressure.

Our invention also relates to means to create and maintain, in a thin wall made of sheet iron, tensile stresses having a determined value in each point of the wall, said means consisting in a rigid support such as a framework or a partial or total covering of reinforced concrete, the said support being connected with the aforesaid wall in such a manner as to maintain said tensile stresses in said wall once same are created.

Our invention also concerns means for obtaining a tensile stress of appropriate value in a thin wall, as above explained, said means consisting in the use of fluid pressure exerted on the wall while the latter is free from any framework or the like, in such a manner that it may freely assume its definite working shape under the action of pressure, the said shape being thereafter maintained by connection with the rigid support.

Our invention has also for its object, in the case of a plurality of tanks, to provide means interconnecting said tanks with each other in such a way that when the internal pressure within a tank exceeds the safe limit (which is for instance from 150 g./cm.² to 1 kg./cm.² or more) the excess of gas may escape therefrom into the other tanks wherein the internal pressure is lower, instead of being lost in the atmosphere.

In the annexed drawings:

Fig. 4 is a vertical section of another kind of tank according to our invention.

Fig. 5 is a partial horizontal section thereof taken along line 5—5 of Fig. 4.

Fig. 6 is an enlarged partial vertical section thereof.

Figs. 7 and 8 are partial sections of the upper part of the tank, taken at right angles to each other to illustrate the anchoring means between the sheet-iron wall and the re-inforced concrete covering.

Figure 1:
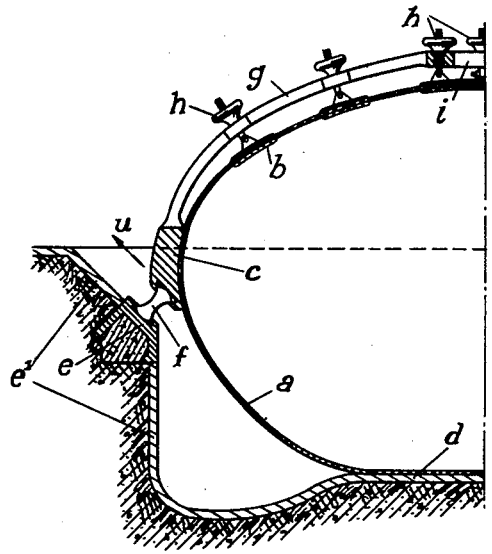
Fig. 1 is a partial vertical section of a tank according to our invention.
Figure 2:
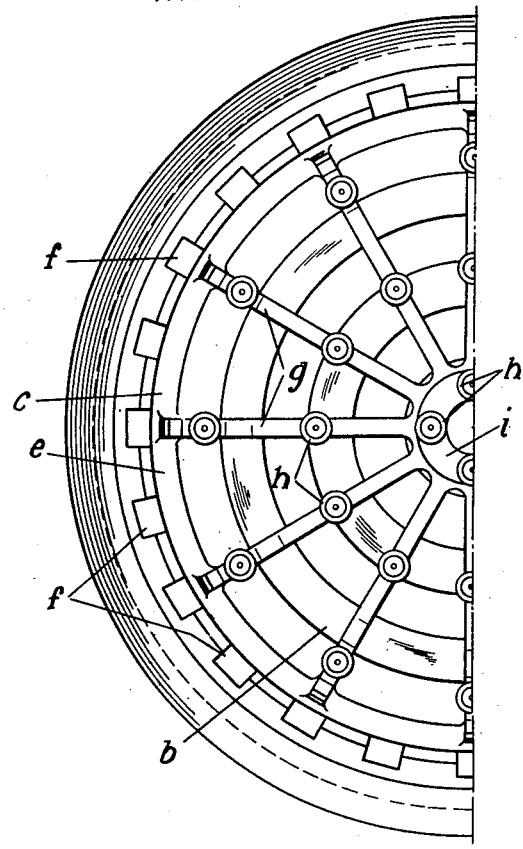
Fig. 2 is a plan view thereof.

In the embodiment of Figs. 1 and 2 the tank proper comprises two opposed cup-shaped parts $a$ and $b$ respectively disposed above and below a horizontal plane wherein they are jointed to each other and to a common belt $c$. The lower part $a$ rests on a base $d$ which may be plane, as shown, or curved, and belt $c$ is supported by a circular support or base $e$ through oblique rods $f$ having their ends rounded cylindrically to a diameter equal to their length, each rod thus operating as a portion of a roller proper.

The walls of the tank (parts $a$ and $b$) are preferably made of metal parts assembled by riveting, welding or the like, though reinforced concrete could also be used in certain instances. The tank is preferably so shaped that the horizontal sections thereof are circular while the vertical axial sections are more or less elliptic; but the horizontal sections could also be elliptic.

It will be understood that the lower part $a$ of the tank, being hung to belt $c$, is always under tension in the two main directions irrespective of the actual quantity of liquid within the tank. Part $a$ may thus be made with the minimum thickness. The stresses from part $a$, including the resultant of liquid pressure on it, are transmitted to belt c and thence to base e through rods f.

The relative displacements between belt c and base e resulting from the changes in the dimensions of the tank due to temperature or pressure variations, changes in the quantity of liquid contained, etc., are taken into account by rods f which operate as rollers, as above explained. It will be observed that while these displacements take place in a radial horizontal direction, they also comprise a noticeable vertical component in such a manner that their mean direction is oblique, as indicated by arrow u in Fig. 1. The rolling surfaces of base e and of belt c are therefore disposed obliquely as shown. Due to this obliquity, rods f exert on belt c a radial reaction, directed towards the center of the tank, which compensates in part the forces applied on belt c by the internal pressure.

The rods f, as shown in Fig. 1 of the drawings, have enlarged heads engaged in undercut recesses in the belt c and ground support e. In this way, the rods act not only in compression to resist downward movement of belt c, but also in tension when the tank is partly filled to resist upward movement of the belt away from the base. The direction of these rods, as is clear, is substantially normal of that of the arrow u.

A watertight wall $e_1$ is provided between base d and base e to form a safety pit adapted to receive the liquid in the case of an accident to the tank. This safety pit may be dug into the soil as shown or it may be formed by lateral walls supporting base e above ground level.

Means may be provided for adjusting the height of belt c with respect to base d in order to control the tensile stresses imparted to part a.

When the tank may be submitted to such a degree of vacuum that part a runs the risk of compression strains directed along its periphery in a horizontal plane, the thin wall forming said part may be reinforced by an appropriate framework or rigid covering of any kind, preferably disposed externally.

Concerning part b, it will be undersetood that the weight of liquid within the tank and the internal pressure also cause tensile stresses in the two main directions of the wall forming said part, such stresses being however far less important than in the case of part a. But the risk of compression strains under the action of vacuum, or even under the weight of the sheet-iron when the tank is partially empty, becomes higher. This is taken into account by providing means which impart to part b tensile stresses equal to or higher than those resulting from the normal internal working pressure. In this manner the material of the wall is used in mechanical conditions which do not much vary whatever may be the external and internal pressures and moreover this arrangement reduces or practically suppresses carburetted gas losses caused by breathing in the known constructions.

The normal working pressure of the tank (gas pressure above liquid level) may run from 150 to 500 g./cm.$^2$ or even reach 1 kg./cm.$^2$ or more.

In Figs. 1 and 2 the means for imparting tensile stresses to part b comprise a framework g resting on belt c and surrounding the said part b. Framework g is connected with part b by a number of screws and nuts h forming adjustable connections appropriately disposed on the surface of part b.

Framework g may be made of re-inforced concrete and it comprises preferably, as shown, a number of arcuate members extending radially from a central member i to belt c.

The initial tension of part b may be obtained by merely actuating nuts h, or, preferably, by submitting the tank to such an internal pressure that part b is tensioned to the desired degree and assumes a shape which is fixed by gently tightening nuts h.

Framework g could be disposed internally with respect to part b and it could be connected with the latter by any appropriate adjustable or non-adjustable means.

Figure 3:
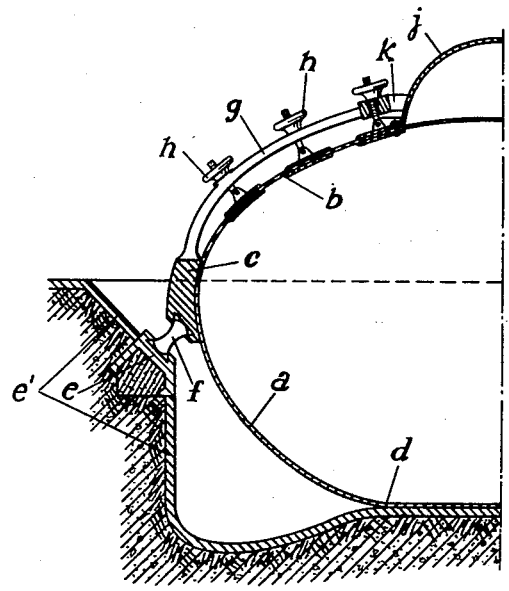
Fig. 3 is a partial vertical section of a modified form thereof.

In the embodiment of Fig. 3, which is otherwise similar to the construction shown in Figs. 1 and 2, the annular central member k of the framework g is of relatively large diameter to accommodate a dome j provided at the top of part b. The weight of this dome is entirely supported by belt c through members k and g. This dome forms a housing adapted to receive any appropriate apparatus related to the tank for control, safety, etc. It may be of standardized dimensions corresponding to the aforesaid apparatus, and adapted to be disposed on tanks different in shape or diameter.

In the embodiment of Figs. 4 to 6, belt c is supported by means of members l sufficiently elastic to permit the relative displacements resulting from temperature or pressure variations, etc. Members l and belt c are made of re-inforced concrete, together with base e, as shown in Fig. 6 so as to ensure perfect anchorage between the belt and the ground. The external framework adapted to maintain part b under tension is formed of a covering m of re-inforced concrete to which the sheet-iron forming part b is attached by anchoring means n (Figs. 7 and 8) eventually combined with steel cores p (Fig. 6).

Part b which in the free state assumes the position shown in dash and dot lines in $b_1$ (Fig. 4) is first inflated by any appropriate means, for instance by means of internal pressure, and the external covering m is then applied. When the concrete is set, the internal pressure may be released; part b is maintained in the tensioned state. In this way part b may be made of thin plates of sheet-iron assembled together by welding, for instance, such an arrangement forming a sort of elastic membrane which is brought to its correct shape by the internal pressure, almost irrespective of the eventual defects in the assembling of the plates, as in the case of an air bag.

The internal pressure may conveniently be produced hydraulically with one or several liquids of appropriate specific weights, by means of a vertical tube filled up to a predetermined height, which ensures a constant pressure. But any other appropriate arrangement could be used.

When the tank is elliptic, ovoid, etc., in shape the thickness of the sheet-iron plates may be correspondingly varied.

The anchoring means n may be of any known construction. In Figs. 7 and 8 they are formed of U-shaped rods welded against the sheet-iron in q, the rods initially resting against part b as indicated in dashed lines in $n_1$ and being thereafter brought to the position shown in full lines in n by bending at 90°. Such an arrangement avoids any possibility of damage to the sheet-iron.

Figure 9:
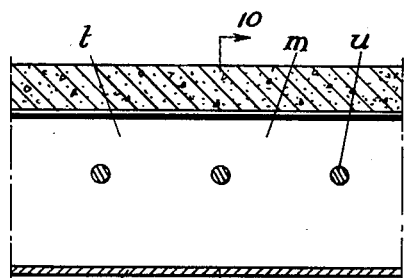
Figs. 9 and 10 are similar sections showing a modified form of anchoring means.
Figure 10:
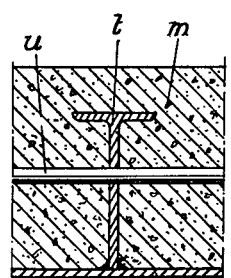
Figure 11:
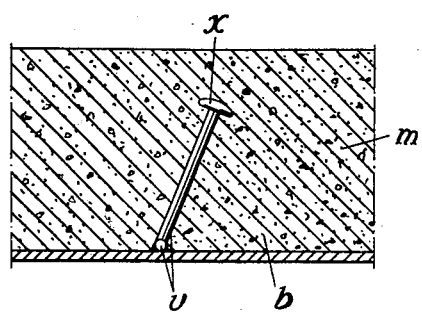
Fig. 11 is a similar section illustrating a further modification.

In the modification of Figs. 9 and 10 T-irons t are welded to part b and embedded in the concrete. Steel cores u are passed through irons t. In the modification of Fig. 11 the anchoring means are formed of rods $v$ provided with a head $x$.

The tank of Figs. 4 to 6 is provided with a cup-shaped dome $j$ having a radius of curvature somewhat lower than the adjacent parts of the tank. The edges of this dome are preferably so arranged that they form a line of reduced mechanical strength adapted for rupture in the case of an excess of internal pressure, the dome then being blown up, which avoids damage to the tank proper.

The weight of dome $j$ is mainly supported by covering $m$.

Summarizing the tank according to our invention comprises:

A lower central portion resting on a base (base $d$), it being observed that base $d$ could be dispensed with in some cases, the whole weight of part $a$ being supported by belt $c$.

A lower annular portion hung to belt $c$ and in stable tensile equilibrium even when the tank is empty.

An upper portion hung to a rigid support (framework $g$ or covering $m$) and thus also in a state of tension even when the tank is empty, and eventually a dome $j$ adapted to house the necessary apparatus, such dome being mainly supported by the rigid support. This weight helps the latter to resist in the case of excessive internal pressure.

Our improved tank permits of using working pressures well above those admissible with the known constructions, which reduces the losses of any kind, during storage as well as during filling, emptying, etc. The quantity of metal required is nevertheless reduced to a minimum.

In the case of a group of tanks, there is preferably provided interconnecting means whereby excess of gas may be led from one tank to another.

Figure 12:
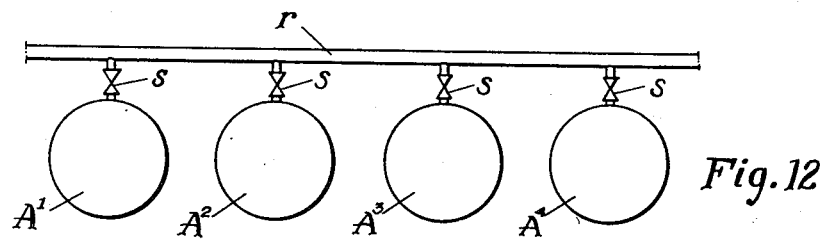
Fig. 12 is a diagrammatical plan view showing a group of tanks arranged in accordance with our invention.

In the diagrammatical representation of Fig. 12 a number of tanks $A_1$, $A_2$, $A_3$, $A_4$ are connected to a gas collector pipe $r$ through individual valves $s$ so arranged that when the internal pressure within a tank exceeds a given limit, carburetted gas from this tank flows into the tanks in which the pressure is low, such an arrangement avoiding the losses resulting from operation of known safety valve devices, wherein the excess of gas is blown out into the atmosphere.

Valves $s$ may be of any type and they may be actuated automatically or manually. They are controlled either by pressure differences, or by the internal pressure proper, or by the height of liquid within the respective tanks, etc.

Figure 13:
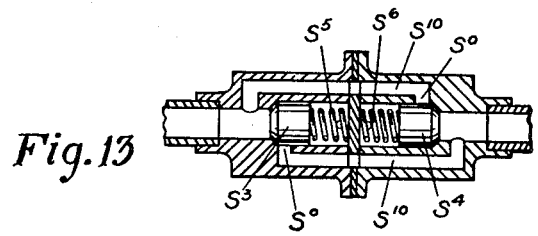
Fig. 13 is a section of a connecting valve device for the tanks of Fig. 12.

In the embodiment of Fig. 13, the valve device comprises two pistons $s_3$, $s_4$ pressed by springs $s_5$, $s_6$ against seats closing respectively both ends of the device. And each piston $s_3$ or $s_4$ also covers a lateral opening $s_0$ connected by a passage $s_{10}$ to the opposed end of the device. When the pressure in the pipe connected with the left end of the device, for instance, exceeds a given limit, piston $s_3$ is pushed and uncovers the corresponding opening $s_0$ whereby gas may flow from left to right through passage $s_{10}$.

Figure 14:
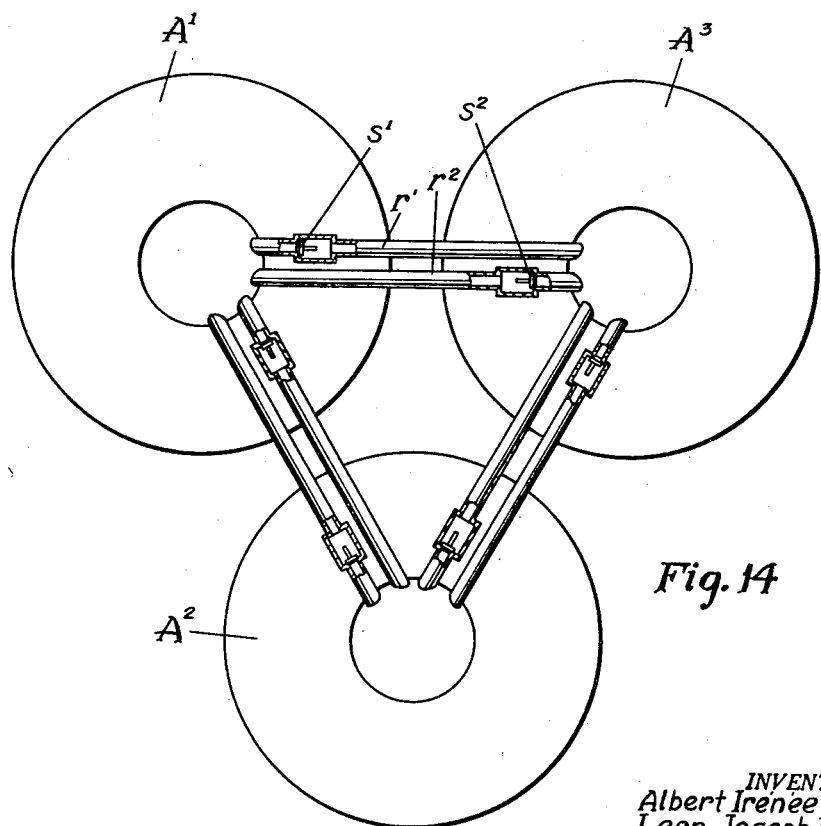
Fig. 14 is a plan view showing a modified arrangement of a group of tanks.

Fig. 14 shows a modified embodiment using two opposed valves $s_1$, $s_2$ disposed on pairs of pipes $r_1$, $r_2$ connecting the three tanks $A_1$, $A_2$, $A_3$.

It will be observed that the internal pressure within the tank facilitates the outlet of liquid therefrom. This internal pressure may be increased, when necessary, by means of compressed air or gas (burnt gases, for instance) forced into the upper part of the tanks.

Our invention is also useful in the case of the settling of crude oil. This operation is generally effected by successively heating and cooling the oil, which entails fuel consumption and vapour losses by breathing. These losses are avoided by the use of a high internal pressure which increases the boiling temperature of the lighter portions of the oil, and the fuel consumption is correspondingly reduced.

Our invention is also of advantage in the case of oils of high viscosity which necessitate a previous heating to flow through the pipes and pumps since, owing to the internal pressure within the tank, the degree of heating may be reduced, which lowers fuel consumption.

The tanks according to our invention may be heat-insulated, it being remarked that a concrete covering already acts as an insulating layer. The invention may be applied to existing tanks.

The tanks according to our invention are particularly adapted for the storage of liquid fuels, but they may be used for any other purpose, for instance for storing a gas under pressure. They may even be adapted to operate under vacuum.

We claim:

1. A tank of oval vertical axial section which comprises, in combination, a single metallic wall structure made of two portions, assembled together, an upper one and a lower one, the diameter of said wall structure in the plane of maximum horizontal cross section being greater than the height thereof, a rigid belt fixed to both of said portions and located at least substantially in the plane of maximum horizontal cross section of said tank, means for supporting said belt directly from the ground and means supported by said belt and extending to a plurality of evenly distributed points of said upper portion for constantly subjecting said upper portion to tensile stresses irrespective of the state of filling of said tank.

2. A tank according to claim 1 in which the last mentioned means include radial framework elements extending above said upper metallic portion and resting upon said belt, and tie rods interconnecting said framework elements and said upper metallic portion.

3. A tank according to claim 1 in which the last mentioned means include a concrete dome extending above said upper metallic portion and resting upon said belt, and adhering to said upper metallic portion, said concrete dome being prestressed to subject said upper metallic portion constantly to tensile stresses.

4. A tank of oval vertical axial section which comprises, in combination, a single thin metal wall structure made of two portions, assembled together, an upper one and a lower one, the lower wall portion resting and supported partly on the ground the diameter of said wall structure in the plane of maximum horizontal cross section being greater than the height thereof, a rigid belt fixed to both of said portions and located at least substantially in the plane of maximum horizontal cross section of said tank, a supporting base on the ground about the vertical projection thereon of said belt and interconnecting means adapted to resist both tensile and compression stresses directly interposed between and anchored to said belt and said base.

5. A tank of oval vertical axial section which comprises, in combination, a single metallic thin metal wall structure made of two portions, assembled together, an upper one and a lower one, the lower metallic portion resting and supported partly on the ground, the diameter of said wall structure in the plane of maximum horizontal cross section being greater than the height thereof, a rigid belt fixed to both of said portions and located at least substantially in the plane of maximum horizontal cross section of said tank, a supporting base on the ground about the vertical projection thereon of said belt, and a plurality of oblique arms distributed along the periphery of said tank and each anchored at one end to said base and at the other end to said belt so as to be able to resist either tensile or compression stresses exerted between said belt and said base.

6. A tank according to claim 5 in which said arms are pivotally connected both to said belt and to said base, to accommodate deformations and displacements of said belt.

7. A tank according to claim 5 in which said arms are elastically mounted at their ends to accommodate deformations and displacements of said belt.

8. A tank of oval vertical axial section which comprises, in combination, a single metallic wall structure made of two portions, assembled together, an upper one and a lower one, the lower metallic portion resting partly on the ground, the diameter of said wall structure in the plane of maximum horizontal cross section being greater than the height thereof, a rigid belt fixed to both of said portions and located at least substantially in the plane of maximum horizontal cross section of said tank, means interposed between said belt and a plurality of evenly distributed points of said upper portion for constantly subjecting said upper portion to tensile stresses irrespective of the state of filling of said tank, a supporting base on the ground about the vertical projection thereon of said belt, and interconnecting means adapted to resist both tensile and compression stresses interposed between said belt and said base.

ALBERT IRÉNÉE CAQUOT.
LÉON JOSEPH DUBOIS.

REFERENCES CITED

The following references are of record in the file of this patent:

UNITED STATES PATENTS

| Number | Name | Date |
| --- | --- | --- |
| 638,280 | Robinson et al. | Dec. 5, 1899 |
| 1,685,926 | Mauran | Oct. 2, 1928 |
| 1,997,808 | Blackburn | Apr. 16, 1935 |
| 2,038,767 | Spaeth | Apr. 28, 1936 |
| 2,095,256 | Horton | Oct. 12, 1937 |
| 2,289,913 | Joor | July 14, 1942 |
| 2,313,997 | Jackson | Mar. 16, 1943 |
| 2,359,446 | Scudder | Oct. 3, 1944 |
| 2,382,171 | Pomykala | Aug. 14, 1945 |
| 2,386,958 | Jackson | Oct. 16, 1945 |
| 2,402,175 | Mapes | June 18, 1946 |

FOREIGN PATENTS

| Number | Country | Date |
| --- | --- | --- |
| 525,687 | Great Britain | Sept. 3, 1940 |
| 895,638 | France | Apr. 11, 1944 |
| 895,642 | France | Apr. 11, 1944 |